Jan. 21, 1947.  W. E. URSCHEL ET AL  2,414,493
CORING DEVICE FOR FRUITS AND VEGETABLES
Filed Jan. 13, 1943   4 Sheets-Sheet 1

FIG. 1.

INVENTORS.
William E. Urschel
Joe Richard Urschel
Gerald W. Urschel
By: Loftus, Moore, Olson & Trexler
ATTORNEYS.

Jan. 21, 1947. W. E. URSCHEL ET AL 2,414,493
CORING DEVICE FOR FRUITS AND VEGETABLES
Filed Jan. 13, 1943 4 Sheets-Sheet 2

INVENTORS
William E. Urschel
Joe Richard Urschel
Gerald W. Urschel
By: Loftus, Moore, Olson & Trexler ATTORNEYS Jan. 21, 1947.   W. E. URSCHEL ET AL   2,414,493
CORING DEVICE FOR FRUITS AND VEGETABLES
Filed Jan. 13, 1943   4 Sheets-Sheet 4

INVENTORS
William E. Urschel
Joe Richard Urschel
Gerald W. Urschel
By: Loftus, Moore, Olson & Trexler   ATTORNEYS Patented Jan. 21, 1947

2,414,493

UNITED STATES PATENT OFFICE 2,414,493

CORING DEVICE FOR FRUITS AND VEGETABLES

William E. Urschel, Joe Richard Urschel, and Gerald W. Urschel, Valparaiso, Ind.

Application January 13, 1943, Serial No. 472,208

20 Claims. (Cl. 146—52)

This invention relates to devices for coring fruits and vegetables. The invention is illustrated in relation to improvements on the device disclosed and claimed in Patent No. 2,252,951, dated August 19, 1941, entitled "Tomato corer." It is to be understood however, that the features of the invention are not limited to the mechanisms disclosed in said patent.

In said prior Patent 2,252,951 the coring knife is actuated by a reciprocating rod within a rotating tubular shaft. Such prior construction involved a multiplicity of parts and was relatively complicated. One of the objects of the present invention is to improve such construction by arranging the coring knife as stationary relatively to its drive shaft whereby the arrangement is simplified and the operation improved, and whereby also the knife holder is provided in a manner to give a more flexible adjustment of the size of the core to be removed.

So also in the prior patent in connection with the tomato holding engaging mechanism which coacted with the coring knife, the same comprised a ring adapted to be positioned on the top of the tomato to prevent it from turning or shifting during the coring operation. Because some tomatoes are irregular in shape the ring of the prior patent had a tendency to tip the tomato before it could be cored and therefore one of the objects of the present invention is to improve such construction by providing a new type of holding means comprising spring tensioned holding fingers adapted to contact the tomato one each side of the tomato with sufficient pressure to prevent the tomato from turning while being cored and whereby to reduce the tendency of the tomato to tip.

So also in the old type of coring mechanism shown in Patent No. 2,252,951 the full weight of the coring head was brought down into contact with the tomato all at once, and since the machine operated at high speed the impact of this coring head on the tomato was considerable. One of the objects of the present invention is to provide a new construction of coring head or unit in which the impact of the coring unit on the tomato is partially absorbed by spring tensioned holding means. More specifically, in the new coring unit as the unit descends onto the tomato the spring tensioned holding members first come into contact with the tomato and then as the coring unit continues to descend part of the weight of the coring unit is gradually applied to the tomato through the spring tensioned holding fingers so that when the gauging means finally comes to rest on the tomato, part of the weight of the coring unit will have already been applied to the tomato and thus the impact of the coring head on the tomato is materially reduced and the rupture of the seed cells of soft tomatoes prevented.

In another phase of the invention, in the old type of coring mechanism shown in the patent, the gauging and holding ring lowered upon the tomato and thereafter the knife entered the tomato and cut out the core. In cases of irregularly shaped tomatoes the gauging ring had a tendency to tip the tomato and disturb its axis so that when its axis was disturbed during the cutting, the tomato was necessarily improperly cored.

Therefore another of the objects of the present invention is to provide co-acting coring and holding mechanism arranged so that spring tensioned holding fingers or their equivalent contact and hold the tomato as the coring knife is entering the tomato, the arrangement being such that as the resistance to the cutting increases the pressure of the holding fingers on the tomato increases until the maximum depth of the coring knife is approached. At this point the gauging means contacts the top of the tomato and stops further lowering of the knife and at the moment of greatest resistance to the knife cut assists the holding fingers in preventing the tomato from turning. In the new coring mechanism therefore, the sequence of operations is such that the core of the tomato is practically all cut before the gauging means contacts the top of the tomato. Thus in case the gauging means does tip the tomato, the cutting of the core will not be materially affected as the greater portion of the core will be cut before the gauging means can tip the tomato.

A further object of the invention is to provide a suitable frame and support for the mechanism of the machine whereby the machine is easily adjusted to suit the various operating conditions.

These and other objects of the invention will be apparent from a perusal of the following specification when taken in connection with the accompanying drawings, wherein.

Figure 10:
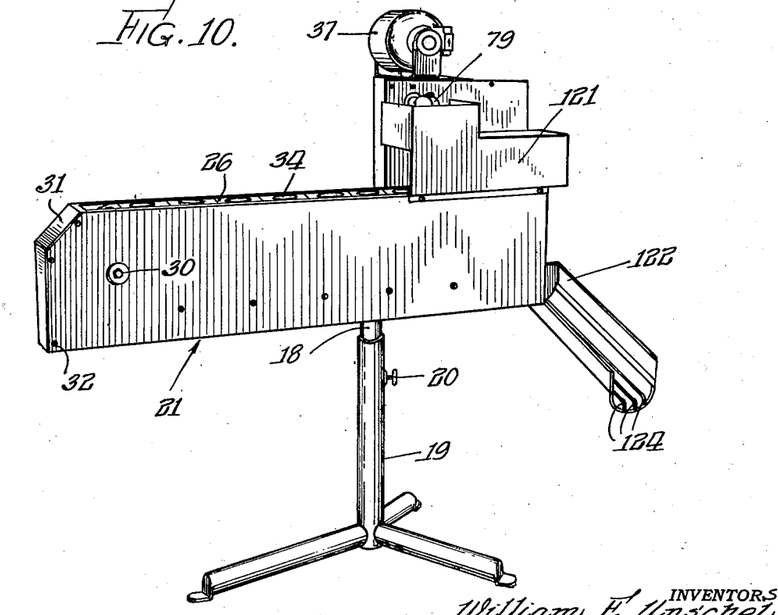
Figure 10 is a perspective view from the side of the complete machine.

Referring now to the drawings in detail, the machine comprises a frame of three longitudinal angle irons 1, 2 and 7 which are held in spaced relation at one end by angle iron 3, and at the other end by an angle iron 4. These angle irons are secured together, preferably by welding. Transverse flat sections 9 and 10 welded to longitudinal frame angle irons 7 and 2 form a support or platform on which the cutting unit frame hereinafter described as 41 may be secured by suitable means through apertures 16 and 17. Plate 15 welded between longitudinal frame members 2 and 7 forms a base to which a bearing box 11 is bolted. Shaft 12 journalled in bearing box 11 has secured at one end a gear 13 and at the other end there is provided a conveyor chain drive sprocket 14. A vertical tube or pipe 5 is welded to the longitudinal frame member 2 and to the transverse frame member 4. A brace 8 welded between the frame 2 and the tube 5 makes the structure more rigid. As shown in Figure 10 a pipe 18, which is secured in tube 5, projects downwardly into a standard 19 which rests on the floor to provide an upstanding support for the entire machine. The position of the pipe or tube 18 may be adjusted in the standard 19 by thumb screw 20 so that the height of the machine may be raised or lowered to suit operating conditions.

Figure 7:
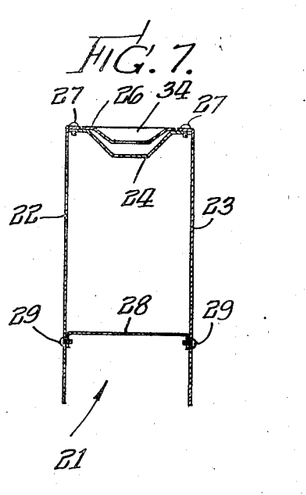
Figure 7 is a view in section of the holder and conveyor.
Figures 8, 9:
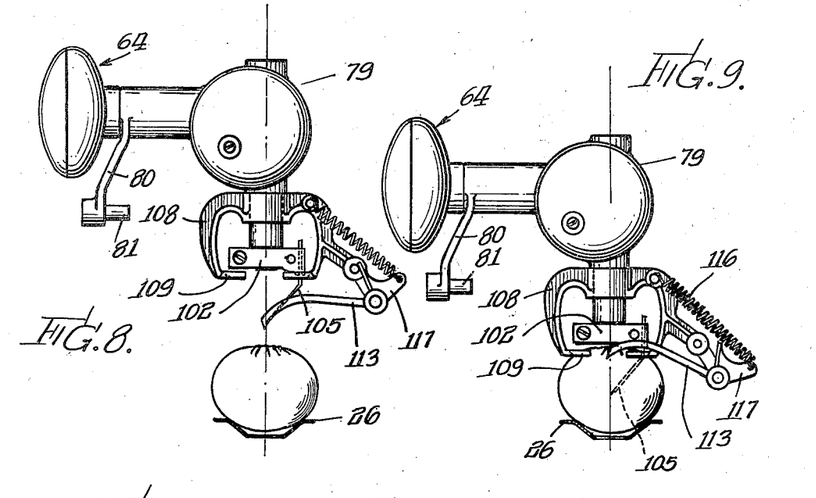
Figure 8 is a view from the discharge end of the coring unit showing the relative position of the various parts before the coring knife enters the tomato.
Figure 9 is a corresponding view showing the position of the parts as the coring knife reaches its maximum depth.

The machine is provided with means for conveying the tomatoes past the coring station. This preferably comprises an endless conveyor 21 secured to the side of the frame at the longitudinal angle iron 2 and the vertical angle iron 6. The conveyor is formed by two parallel side members 22 and 23 held in spaced relation at the top by a trough-like member 24 which also forms a spline for the conveyor hinged plates 26. Screws 27 hold said members securely together as shown in Figure 7. The lower edges of these side members 22 and 23 are held in spaced relation by a channel member 28 and the screws 29. An endless plate conveyor 26 disposed in the conveyor 21 between the two side members 22 and 23 is driven by the sprocket 14 and idles at the other end on an idler sprocket not shown, similar to the drive sprocket 14, which latter sprocket is rotatably mounted on the idle stud 30. An end plate 31 secured between the two side members 22 and 23 at the feed end by screws 32 protects or guards the conveyor chain and stiffens the conveyor assembly. The conveyor plates in the present case are formed of sheet metal and are hinged together by pins. Each conveyor plate 26 is provided with a circular concave pocket 34 providing a holding means adapted to receive and hold a tomato or other fruit or vegetable with its stem extending vertically over the center of the pocket.

Means is provided for mounting a motor on the base. Secured to the side of the frame at the longitudinal angle irons 1 and 4 by bolts or other means and extending vertically to support a motor base 35, is a frame upright 36 of sheet metal. This upright 36 supports the motor base 35 and also serves as a guard to enclose the gearing of the machine. This upright 36 is also screwed to conveyor side member 23.

Figure 1:
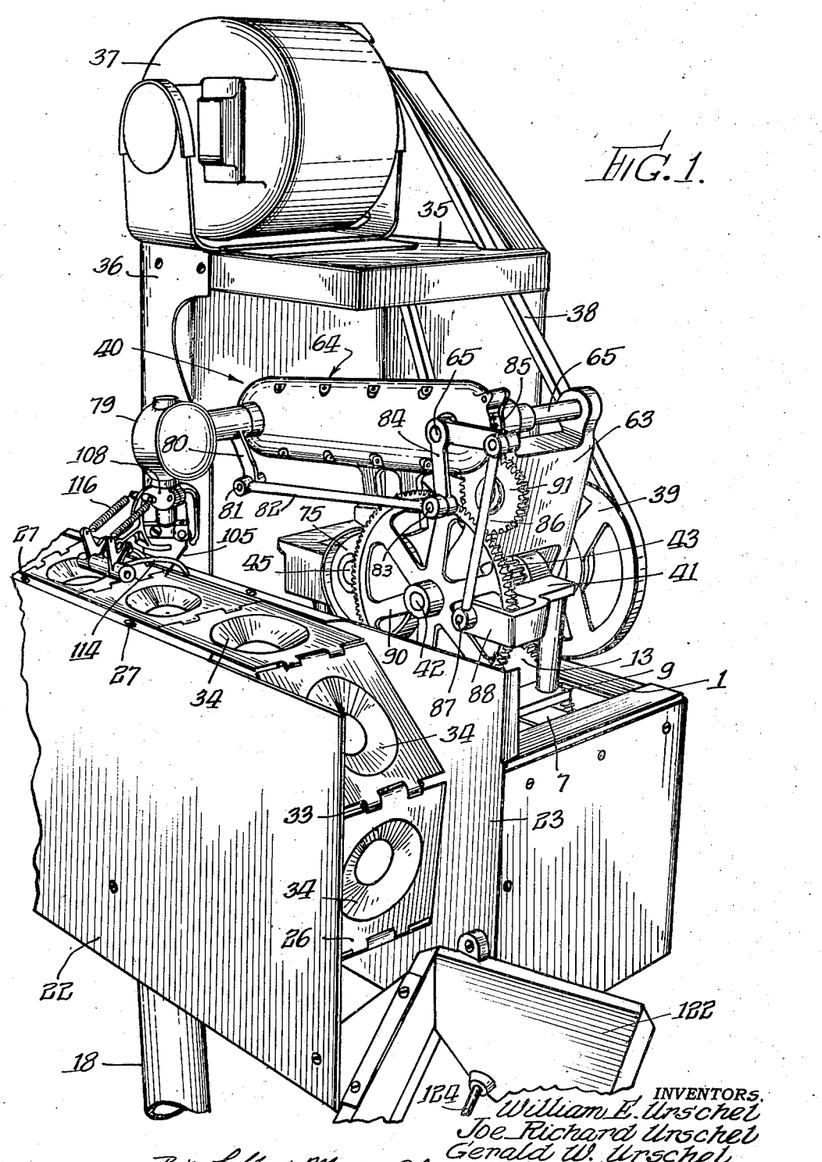
Figure 1 is a perspective view of the discharge end of the machine, viewing it from one side.
Figure 2:
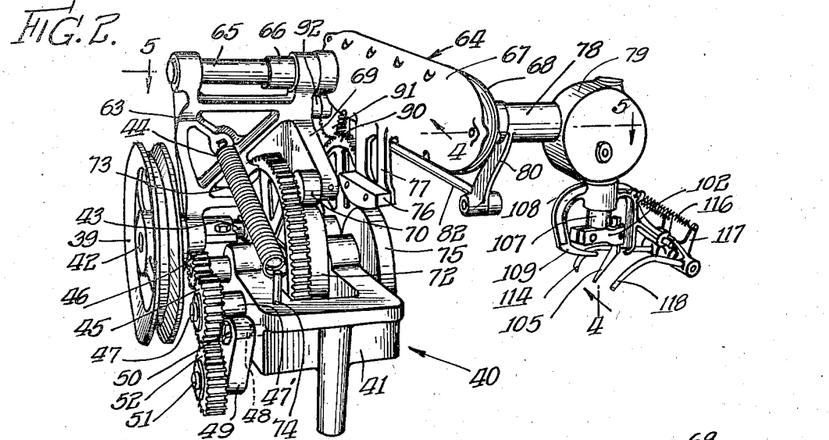
Figure 2 is a perspective view of the coring and holding mechanism and driving mechanism therefor.

Coring means 40 is mounted under the motor support 35 on the frame members 7 and 9, as shown in Figures 1 and 2. The operating mechanism of the coring means 40 is supported by the bearing bracket 41. The shaft 42 journalled in bearing bracket 41 is driven by a V-belt pulley 39 keyed to shaft 42. Motor 37 secured to the motor support 35 drives the belt pulley 39 through the motor pulley and V-belt 38. A gear 43 secured to shaft 42 drives gear 44 which in turn drives the cam shaft 45. Another gear 46 secured to the shaft 45 in turn drives gear 47 which is rotatably mounted on a stud 47'. This stud 47' is securely fixed in the bearing bracket 41.

Gear 47 drives gear 52 which is rotatably mounted on stud 51 which is fixed in pivoted gear holder 49. Said gear holder 49 is pivoted on stud 48 and is locked in position by a cap screw 50 which is screwed into bearing bracket 41. As the aperture in the gear holder 49 through which the capscrew 50 passes is larger in diameter than the capscrew 50, a slight adjustment is provided for adjusting the mesh between gear 52 and gear 13. Gear 52 drives gear 13 which is secured to the sprocket drive shaft 12.

Means is provided to check travel of the coring mechanism and the tomato holding means together during the continuous movement of the series of tomato holding means so that greater speed of operation of the device may be attained, and thus eliminating the necessity of an intermittent movement of the tomato feeding belt with consequent delay. To this end an oscillating bracket 63 is hinged about the axis of shaft 42 on bearings which are secured in the bearing bracket 41. At the upper end of oscillating bracket 63 is pivoted an arm 64. This arm 64 is comprised of two elongated hollowed out members 67 and 68 which are bolted together. (See Figures 4 and 5.) A pin 65 is securely fixed in member 67 of arm 64 and is pivoted in bearings at the upper end of oscillating bracket 63. A collar 66 on pin 65 retains the arm 64 in its proper position. The bracket 63 is oscillated by cam 72 which is keyed to the cam shaft 45. An arm 69 extending from the bracket 63 has at its end a cam roller 70 rotatably mounted on stud 71 which is securely fixed in arm 69. The cam roller 70 is in contact with the periphery of the cam 72. A tension spring 73, secured at one end to oscillating bracket 63 and at the other end to a projection 74 on bearing bracket 41, urges the cam roller 70 against the periphery of the cam 72 and provides the motive force to move the oscillating bracket 63 on its return stroke.

The arm 64 which carries the coring and tomato holding mechanism is raised by cam 75 and is lowered by gravity. This cam 75 is keyed to the cam shaft 45. An extension 77 from the member 67 of the arm 64 terminates with a cam follower 76 which contacts the periphery of this cam 75.

Mounted on arm 64 is a knife bearing bracket 79. This bearing bracket 79 is pivotally mounted on the bearing extension 78 of member 68 of the arm 64. (See Figures 4 and 5.) Arm 80 extending downwardly from the bearing bracket 79 holds securely a stud 81. Arm 80 is connected to a bell crank 84 by a connecting rod 82, see Figure 1, which is pivotally mounted on stud 81 of arm 80 and stud 83 of bell crank 84. The bell crank 84 is pivotally mounted on the reduced extension of pin 65. Bell crank 84 is connected to the U-shaped extension 88 which is a part of bearing bracket 41, by the connecting rod 86. This rod 86 is pivotally mounted on stud 85 of bell crank 84 and stud 87 of the extension 88.

Figure 3:
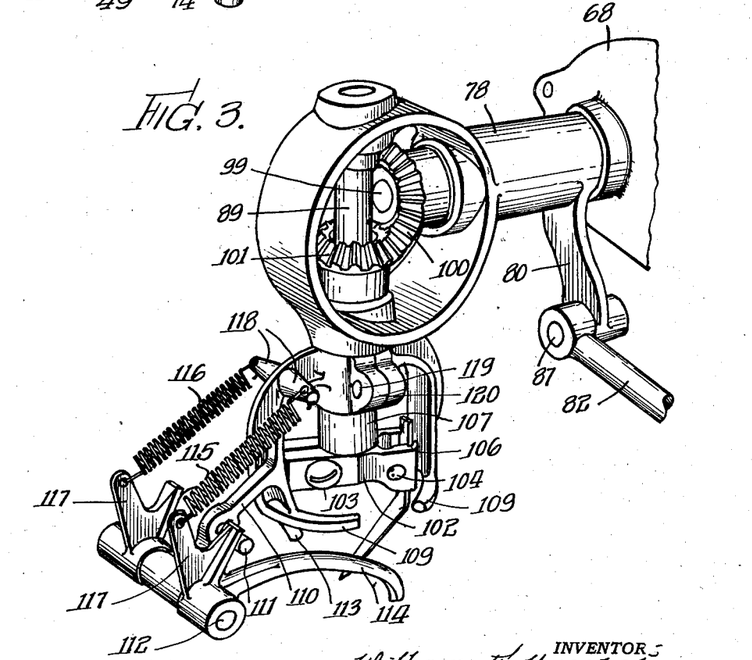
Figure 3 is a perspective view of the coring and holding devices.
Figure 4:
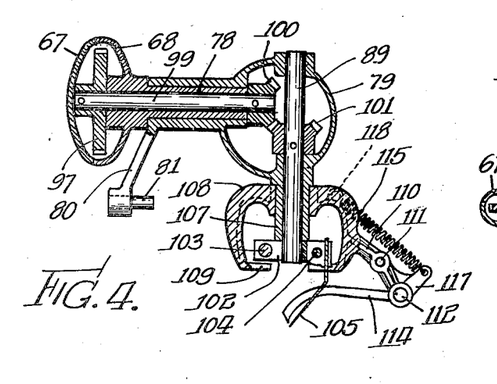
Figure 4 is a view in section of the cutting and holding mechanism taken on the line 4—4 of Figure 2.
Figure 5:
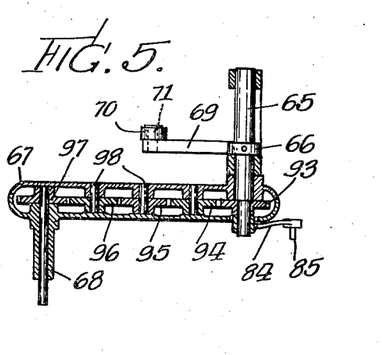
Figure 5 is a view in section of the arm that carries the coring mechanism, showing a part of the knife drive, taken on the line 5—5 of Figure 2.
Figure 6:
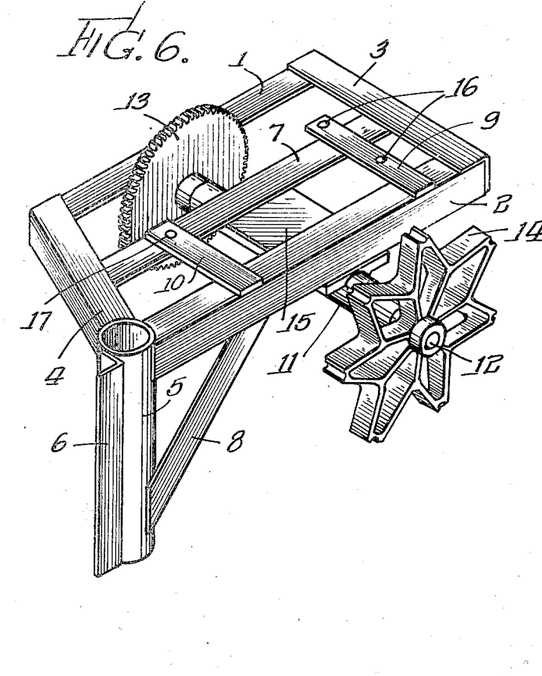
Figure 6 is a perspective view of the frame of the machine and a portion of the driving mechanism.

In the bracket 79 is journalled a vertical knife drive shaft 89 (see Figures 3 and 4). To describe the drive for the knife shaft we shall return to the main drive shaft 42 which is journalled in the bearing bracket 41. Gear 90 is keyed to the main drive shaft 42 and drives gear 91 which is rotatably mounted on a stud fixed in the boss 92 of the oscillating bracket 63 as shown in Figure 2. Referring now to Figure 5, gear 91 drives gear 93 which is rotatably mounted on the pin 65. Gear 97 is driven by gear 93 through a train of three gears 94, 95 and 96 which are held between the two members 67 and 68 of the arm 64 and rotatably mounted in studs 98 secured in member 67. Gear 97 is keyed to shaft 99 which is journalled in bearing extension 78 of the member 68. Bevel gear 100, see Figure 3, keyed to shaft 99 drives bevel gear 101 which is fixed to shaft 89 (see Figure 4).

On the lower end of the shaft 89 is mounted a knife holder 102 which is clamped to shaft 89 by a screw 103. A coring knife 105 is mounted in the slot 106 (see Figure 3) of the knife holder 102 and clamped in fixed position by the screw 104.

Mounted on the lower bearing 107 is a U-shaped gauging and holding bracket 108. This bracket 108 terminates at the lower ends in semi-ring segments 109 which are adapted to contact the top of the tomato and to determine or gauge the depth to which the coring knife 105 penetrates the tomato. These arcuate segments 109 also aid in holding the tomato. At the lower end and to one side of the gauging bracket 108 extends an arm 110 which holds the spring tensioned tomato holding fingers 113 and 114. These fingers are pivotally mounted on rod 112 which is fixed in the arm 110. To limit the movement of the fingers a stop 111 is provided. To urge the fingers 113 and 114 against the tomato, tension springs 115 and 116 hook between ears 117 of the fingers 113 and 114, and lugs 118 on the gauging bracket 108. Thus as the coring mechanism lowers on the tomato, the holding fingers 113 and 114 contact the top of the tomato at about the same time as the coring knife begins its cut. The holding fingers 113 and 114 hold the tomato in fixed position in the chain pockets 34 while the coring knife 105 is performing its operation. It will be noted that due to the tension springs 115 and 116, the pressure of the holding fingers 113 and 114 on the tomato increases as the depth of the knife cut increases and sufficient pressure is placed on the tomato to prevent its rotation during the cut. Another function of the holding fingers 113 and 114 is to reduce the impact of the gauging ring segments 109 on the tomato. Due to the fact that some of the weight of the coring mechanism has already been gradually applied to the tomato by the spring tensioned fingers 113 and 114, the impact of the gauging ring segments 109 is reduced. Adjustment of the size of the core to be cut is provided in the knife holder 102. (See Figure 3.) By loosening screw 104 the knife 105 may be moved up or down in its slot 106 and the knife set to suit various conditions. The size of the core cut may also be varied by adjusting the height of the gauging bracket 108, on the bearing 107. This adjustment may be made by loosening screw 119 through the ears 120 of bracket 108.

To move and maintain the coring knife shaft 89 in a position always at right angles to the line of movement of the conveyor mechanism, during the cycle of operation, a pair of coactive parallelograms are provided as apparent from the foregoing construction. Viewing Figure 1 it will be noted that the studs 81, 83, pin 65, and the bearing extension 78 of the arm 64 form the corners of a horizontally disposed parallelogram. Also studs 87 and 85, pin 65 and the shaft 42 form the corners of a vertically disposed parallelogram.

In the operation of the machine the tomatoes are placed in the circular pockets 34 of the conveyor 21 with stem portion facing upwardly and with the vertical axis of the core of the tomato substantially perpendicular to the conveyor. As the tomatoes are carried toward the coring station, the bracket 79 which carries the coring and holding means begins the cycle of operation whereby the coring and holding means simultaneously lowers toward the tomato and travels longitudinally with the tomato. The lowering motion of the coring means is controlled by the cam 75 which allows the arm 64 to descend progressively by gravity. The longitudinal motion of the coring means is provided by cam 72, and the roller 70 which is attached to the oscillating bracket 63. The cam 72 is of such shape as to move the parts in a longitudinal speed equal to that of the conveyor 21.

Continuing with the cycle of operation, as the coring means approach the tomato, the spring tensioned holding fingers 113 and 114 contact the tomato and hold it firmly in its chain pocket 34. The continually revolving coring knife 105 enters the tomato and as further lowering of the bracket 79 continues, the cutting of the core progresses until the ring segments 109 of the gauging bracket 108 contact the top of the tomato whereupon further penetration of the coring knife ceases. After the core has been severed, the entire coring means is raised upwardly by the action of the cam 75 on the cam follower 76 which is secured to arm 64. Simultaneously with this upward movement, the coring means is also moved rearwardly by cam 72 to a position above and in registration with the next successive tomato.

The tomato cores removed by the knife 105 are thrown tangentially from the rotating knife as the said knife raises upwardly after the core has been cut from the tomato. To prevent the cores from being scattered about, a shield 121 is positioned about the coring means as shown in Figure 10. The cored tomatoes are discharged into a chute 122, which in turn deposits the cored tomatoes in a conveyor or in a suitable receptacle. As the bottom of the chute is made up of a plurality of equally spaced rods 124, any cores or pieces of refuse from the tomatoes will fall between the rods 124 and thus be separated from the cored tomatoes.

It is thought that the invention and numerous of its attendant advantages will be understood from the foregoing illustrative description and it is obvious that numerous changes may be made in the form, construction and arrangement of the several parts without departing from the spirit or scope of the invention or sacrificing any of its attendant advantages, the form herein described being a preferred embodiment for the purpose of illustrating the invention.

Having thus described the invention, what is claimed as new and desired to be secured by Letters Patent is:

1. In a device of the class described, in combination with conveying means adapted to travel along a predetermined path and including a series of devices for holding a succession of tomatoes or the like with their stem axes extending in predetermined direction, a coring head, means for moving said coring head toward and from said tomato and along the line of stem axis of said tomato, a coring knife rotatably mounted on said head, auxiliary holding means stationarily mounted on said head, said knife and said auxiliary holding means being maintained a fixed distance apart on said head, and additional holding means mounted on said head in advance of said auxiliary holding means and shiftable on said head relatively to said auxiliary holding means and said knife whereby on movement of said head toward the tomato held in said holding means said second mentioned holding means will first contact the tomato and assist in holding the same while being cut by said rotating coring knife prior to contact of said auxiliary holding means with said tomato, whereby to cushion the pressure of said head on said tomato as said auxiliary holding means contacts said tomato.

2. In a device of the class described, the combination of a device for holding a tomato or the like with its stem axis extending in predetermined direction, a coring head carrying a rotating knife, means for shifting said coring head in the direction of a stem axis of such tomato while so held to cause the rotating knife to core the same, and a plurality of tomato holding means mounted in spaced relation on said head and one of said holding means operating in a plane in advance of the other whereby said plurality of holding means are adapted sequentially to contact the tomato to cushion the contact of said holding means with said tomato, said holding means which initially contacts the tomato including means for holding the tomato from rotation during coring.

3. In a device of the class described, the combination of a conveyor adapted to travel along a predetermined path and including a series of devices for holding a succession of tomatoes or the like with their stem axes extending in predetermined direction, a coring head carrying a rotating coring knife, means for shifting said coring head in the direction of a stem axis of each tomato while so held to cause the rotating knife to core the same, a first auxiliary tomato holding means stationarily mounted on said head and adapted to contact the upper portion of the tomato to hold the same and to act as a depth gauge to determine the depth of cut of the coring knife, and a second auxiliary tomato holding means mounted on said head in advance of said first auxiliary tomato holding means and adapted preliminarily and yieldingly and shiftingly to contact the upper portion of the tomato whereby to hold the tomato during the preliminary coring movements of the knife and to cushion the impact of said first auxiliary tomato holding means.

4. In a device of the class described, the combination of a conveyor adapted to travel along a predetermined path and including a series of devices for holding a succession of tomatoes or the like with their stem axes extending in predetermined direction, a coring head carrying a rotating coring knife, means for shifting said coring head in the direction of a stem axis of each tomato while so held to cause the rotating knife to core the same, a first auxiliary tomato holding means stationarily mounted on said head and adapted to contact the upper portion of the tomato to hold the same and to act as a depth gauge to determine the depth of cut of the coring knife, and a second auxiliary tomato holding means resiliently mounted on said head and adapted yieldingly to contact the upper portion of the tomato in advance of the first auxiliary tomato holding means resiliently to hold the upper portion of the tomato as the coring knife first cuts into the tomato and prior to the contact of the first mentioned auxiliary holding means with said tomato.

5. In a device of the class described, in combination with a conveyor adapted to travel along a predetermined path and including a series of devices for holding a succession of tomatoes or the like with their stem axes extending in predetermined direction, a coring head carrying a rotating coring knife, means for shifting said coring head in the direction of a stem axis of each tomato while held in a holding means of the conveyor whereby to cause the knife to core a tomato, arcuate gauge means stationarily mounted on said head and adapted to contact the top of the tomato to hold the same and to provide a gauge to limit the depth of the cut of the rotating coring means, and shiftable additional holding means mounted on said head and adapted to contact the upper portion of the tomato in advance of the arcuate gauge and holding means and adapted to preliminarily hold the upper portion of the tomato during a portion of the coring operation and prior to the contact of the gauge means with the tomato.

6. In a device of the class described, in combination with a conveyor adapted to travel along a predetermined path and including a series of devices for holding a succession of tomatoes or the like with their stem axes extending in predetermined direction, a coring head carrying a rotating coring knife, means for shifting said coring head in the direction of a stem axis of each tomato while held in a holding means of the conveyor whereby to cause the knife to core a tomato, a first tomato holding means rigidly mounted on said head, and spring tensioned auxiliary holding fingers yieldingly mounted on said head in advance of said rigidly mounted tomato holding means and adapted to contact the tomato on each side of the stem axis to hold the tomato from tipping in its first mentioned holding means during at least a portion of the coring operation.

7. In a device of the class described, in combination with a conveyor adapted to travel along a predetermined path and including a series of devices for holding a succession of tomatoes or the like with their stem axes extending in predetermined direction, a coring head carrying a rotating coring knife, means for shifting said coring head in the direction of a stem axis of each tomato while held in a holding means of the conveyor whereby to cause the knife to core a tomato, a gauge mounted on said coring head comprising a bracket having spaced apart arcuate shaped members adapted to contact the top surface of the tomato on opposite sides of the stem axis to hold the tomato from tipping in the first mentioned holding means and to act as a positive stop to limit the downward movement of the head and the rotating cutting knife thereon, said bracket including an extension and a plurality of shiftingly mounted fingers on said bracket and adapted to engage the top of the tomato on opposite sides of the stem axis, and spring means for yieldably supporting said fingers, said fingers contacting the upper portions of the tomato in advance of the contact of the tomato by said gauge means and whereby to assist in holding the upper portion of the tomato before said gauge means contacts said tomato.

8. In a device of the class described, the combination of a conveyor adapted to travel along a predetermined path and including a device for holding a tomato or the like with its stem axis extending in a predetermined direction, a coring head carrying a rotating coring knife, means for shifting said coring head in the direction of a stem axis of the tomato while held in the holding means of the conveyor whereby to cause the knife to core the tomato, and a pair of arcuately shaped gauge members mounted on said head concentrically about the axis of rotation of said cutting knife and positioned to contact the top of the tomato along arcuate portions oppositely positioned with respect to the stem axis of the tomato, and means resiliently mounted on said head and extending normally downwardly on opposite sides of said arcuate gauge members so as to contact the top portion of the tomato on opposite sides thereof prior to the contact of said arcuate gauge members with the top of the tomato.

9. In a device of the class described, in combination with a conveyor adapted to travel along a predetermined path and including a device for holding a tomato or the like with the stem axis extending in a predetermined direction, a support, a coring head reciprocably but non-rotatably mounted in said support, means for shifting said coring head in the direction of the stem axis of the tomato while held in the holding means of the conveyor, a portion of said coring head being tubular, a shaft rotatably mounted in said tubular portion, means for rotating said shaft, a coring knife carried by the bottom portion of said shaft, said coring head having arcuately shaped gauge members extending laterally from the bottom portion thereof and concentrically surrounding the axis of rotation of said coring knife and auxiliary tomato holding means shiftably mounted on the bottom of said coring head below said gauge members and extending on opposite sides of the axis of rotation of the coring knife below said gauge members whereby upon downward projection of said coring head toward said tomato said auxiliary holding means will contact the top of the tomato and steady the same during a portion of the coring operation and prior to contact of the gauge members with the top of said tomato.

10. The combination of a device for holding a tomato or the like with its stem axis extending in predetermined direction, a coring head carrying a rotating coring knife, a first additional holding means carried by said head for contacting the tomato when held by said device, means for shifting said coring head in the direction of the stem axis of the tomato while the latter is held in the holding means of the conveyor so as to cause the knife to core the tomato and the first auxiliary holding means to contact the tomato, and auxiliary tomato holding members shiftably mounted on said head and extending downwardly below the first additional holding means and on opposite sides of the axis of rotation of the coring knife into position to contact the top portion of the tomato and hold the tomato from rotation when the coring knife is moved in position to core the tomato, and means for increasing the pressure of said holding members on the tomato as the depth of the knife cut increases whereby to further prevent rotation of the tomato during the coring thereof.

11. In combination, a device for holding a tomato or the like with its stem axis extending in predetermined direction, a coring head carrying a rotating coring knife, holding means mounted on said coring head and including means to engage the top of the tomato to hold the tomato from rotation as said coring head is lowered to a position such that the knife cuts into the tomato to core the same, means for automatically and gradually increasing the pressure of the holding means on the tomato as the depth of cut in the tomato during the coring operation increases, and gauge means rigidly carried by the head for arresting the downward movement of the coring knife as it cuts into the tomato for determining the depth of the coring cut.

12. In a device of the class described, in combination with tomato holding means adapted to hold a tomato with its stem in predetermined position, a tomato coring head adapted to be brought into juxtaposition with the stem end portion of said tomato, said head including a vertical rotatable coring shaft, stationary casings thereabout, the lower end of said casing terminating slightly at the end of said shaft and provided with oppositely disposed, arcuate, spaced apart tomato holding members disposed in a common plane adapted to contact diametrically opposite portions of a tomato, a coring head mounted on the end of said coring shaft, a knife rigidly mounted on said coring head and depending below the end of said shaft, the lower end of the knife extending inwardly and terminating in the projection of the axis of rotation of said shaft, a bracket depending from said coring head and extending below the arcuate tomato contacting members on said coring head, a bearing on said bracket, a pair of relatively long fingers pivotally mounted on said bracket and extending forwardly somewhat across the projection of the axis of rotation of said shaft and therebelow and in spaced relation to lie diametrically on opposite sides of the tomato when brought in contact therewith upon the lowering of the head, spring means for resiliently holding said tomato contacting fingers in such lowered position while permitting said fingers resiliently to move upwardly when contacting said tomato, means for rotating said tomato coring shaft, and means for shifting said coring head toward and from said tomato holding means.

13. In a device of the class described, the combination of means for holding a tomato or the like with the stem extending vertically, a coring head including auxiliary tomato holding means mounted thereon and adapted to contact the upper portion of the tomato while held in the first mentioned holding means, a knife rotatably mounted in said head, means for rotating said knife with respect to said auxiliary tomato holding means, means for simultaneously shifting the head including the auxiliary tomato holding means and rotating knife into contact with and then out of contact with said tomato, said knife during rotation coring the tomato while said tomato is held between said first mentioned holding means and said auxiliary holding means, and resiliently yieldable mechanism mounted on said head and having tomato gripping means adapted to come in contact with the tomato before the coring knife or the auxiliary holding means contacts the tomato during the descent of the coring head toward the tomato for holding the tomato from rotation and, whereby also the weight of the coring head is gradually applied to the tomato through said resiliently mounted means.

14. In a device of the class described, the combination of means for holding a tomato or the like with its stem axis extending in predetermined direction, a coring head, a knife rotatably mounted on and with respect to said head, auxiliary holding means likewise mounted on said head and having arcuate portions disposed in a common plane, said arcuate portions being stationary with respect to the knife except for the rotating movement of said knife, means for relatively shifting the tomato holding means and the auxiliary tomato holding means and knife whereby the auxiliary tomato holding means and knife are brought into contact with a tomato, means for rotating said knife while the tomato is held between the two holding means whereby the tomato is cored by the rotating knife, and additional tomato holding means shiftably mounted on said head and having tomato contacting portions normally positioned in advance of the first mentioned auxiliary holding means for preliminarily engaging the tomato and for holding the tomato from rotation.

15. In a device of the class described, in combination with a support, a conveyor adapted to move thereon along a predetermined path, said conveyor including a plurality of holding means into which tomatoes are adapted to be held with their stems uppermost, a rocking cradle pivoted on said support for oscillating movement, a shaft on said cradle, a relatively long housing mounted on said crade, a series of intermeshing gears arranged in a straight line disposed in said housing, power means on said support for driving the gears in said casing in synchronism with the oscillation of the cradle means, a hollow tubular casing extending laterally from said elongated casing, a shaft in said hollow tubular casing and driven from said line of gears, a second hollow casing mounted on the end of said first tubular casing, a coring head depending from said second hollow casing, a shaft in said tubular coring head, gearing in said second hollow casing for driving said last mentioned shaft from said first men- tioned shaft, a coring knife mounted on the bottom end of said last mentioned shaft, gauge members carried by the bottom of said coring head concentrically surrounding the axis of rotation of said coring knife, and means cooperating with said elongated gear housing and said tubular extension for raising said coring head upwardly away from said conveyor in a direction parallel with the stem axis of the tomato and for then moving said coring head rearwardly in a straight line motion at right angles to its upward movement and thence downwardly at right angles to such rearward direction of movement and thence forwardly at right angles to said last mentioned line of movement in synchronism with the movement of a tomato in a holder on said conveyor.

16. In a device of the class described, the combination of means for holding a tomato or the like with the stem extending vertically, a coring head including auxiliary tomato holding means mounted thereon and adapted to contact the upper portion of the tomato while held in the first mentioned holding means, a knife rotatably mounted in said head, means for rotating said knife with respect to said auxiliary tomato holding means, means for simultaneously shifting the head including the auxiliary tomato holding means and rotating knife into contact with and then out of contact with said tomato, said knife during rotation coring the tomato while said tomato is held between said first mentioned holding means and said auxiliary holding means, and resilient means mounted on said head and adapted to come in contact with the tomato before the coring knife or the auxiliary holding means contacts the tomato during the descent of the coring head toward the tomato, whereby the weight of the coring head is gradually applied to the tomato through said resilient means, said last named resilient means having portions engaging the curved upper walls of the tomato on opposite sides of and spaced from the portion of the tomato to be cored by the coring knife.

17. In a device of the class described, the combination of means for holding a tomato or the like with its stem axis extending in predetermined direction, a coring head, a knife rotatably mounted on and with respect to said head, auxiliary holding means likewise mounted on said head and having arcuate portions disposed in a common plane, said arcuate portions being stationary with respect to the knife except for the rotating movement of said knife, means for relatively shifting the tomato holding means and the auxiliary tomato holding means and knife whereby the auxiliary tomato holding means and knife are brought into contact with a tomato, means for rotating said knife whereby the tomato is held between the two holding means while being cored by the rotating knife, and additional tomato holding means shiftably mounted on said head and having tomato contacting portions normally positioned in advance of the first mentioned auxiliary holding means for preliminarily engaging diametrically opposite curved surfaces of the tomato.

18. In a device of the class described, the combination of a conveyor adapted to travel along a predetermined path and including a series of devices for holding a succession of tomatoes or the like with their stem axes extending in predetermined direction, a coring head carrying a rotating coring knife, means for shifting said coring head in the direction of the stem axis of each tomato while so held to cause the rotating knife to core the same, and a plurality of tomato holding means mounted in spaced relation on said head and one of said holding means having devices for gripping the upper surface of the tomato in a manner to hold the tomato from rotation, and said holding means operating in a plane in advance of the other whereby said plurality of holding means are adapted sequentially to contact the upper curved surfaces of the tomato and which surfaces are spaced laterally of the stem axis to cushion the contact of said holding means with said tomato.

19. In combination, a device for holding a tomato or the like with its stem axis extending in predetermined direction, a coring head carrying a rotating coring knife, means for shifting said coring head in the direction of the stem axis of the tomato while the latter is held in the holding device so as to cause the knife to core the tomato, and auxiliary tomato holding arms having relatively pointed ends, said arms being shiftably mounted on said head and extending downwardly on opposite sides of and spaced laterally of the axis of rotation of the coring knife into position grippingly to contact spaced upper curved wall portions of the tomato when the coring knife is moved into coring position to hold the tomato from rotation, and means for increasing the pressure of said holding members on the tomato as the depth of the knife cut increases whereby to prevent rotation of the tomato during the coring thereof.

20. In combination, a device for holding a tomato or the like with its stem axis extending in predetermined direction, a coring head carrying a rotating coring knife, holding means mounted on said coring head and adapted to engage the top of the tomato as said coring head is lowered to a position such that the knife cuts into the tomato to core the same, means for automatically and gradually increasing the pressure of the holding means on the tomato as the depth of cut in the tomato during the coring operation increases, and gauge means adapted to engage the upper surface of the tomato for arresting the downward movement of the coring knife as it cuts into the tomato for determining the depth of the coring cut.

WILLIAM E. URSCHEL.
JOE RICHARD URSCHEL.
GERALD W. URSCHEL.